US007812560B2

(12) United States Patent
Chang et al.

(10) Patent No.: US 7,812,560 B2
(45) Date of Patent: Oct. 12, 2010

(54) REHABILITATION ROBOT AND TUTORIAL LEARNING METHOD THEREFOR

(75) Inventors: Wan-Kun Chang, Taichung County (TW); Yung-Ming Kao, Taichung County (TW); Shih-Chang Liang, Changhua County (TW); Chin-Chu Sun, Taichung (TW); Hsin-Chuan Su, Yunlin County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 381 days.

(21) Appl. No.: 12/050,338

(22) Filed: Mar. 18, 2008

(65) Prior Publication Data

US 2009/0140683 A1 Jun. 4, 2009

(30) Foreign Application Priority Data

Nov. 30, 2007 (TW) .............................. 96145527 A

(51) Int. Cl.
*A61H 1/02* (2006.01)
*B25J 9/00* (2006.01)

(52) U.S. Cl. ............................ 318/568.11; 318/568.14

(58) Field of Classification Search .............. 318/568.1, 318/568.11, 568.12, 568.13, 568.14, 568.17; 901/2–4; 601/5, 23, 33; 482/901
See application file for complete search history.

(56) References Cited

U.S. PATENT DOCUMENTS 4,263,538 A * 4/1981 Richiardi ............... 318/568.14
4,424,472 A * 1/1984 Jacot-Descombes et al. ..... 318/568.13
7,125,388 B1 * 10/2006 Reinkensmeyer et al. ...... 601/5
2004/0158358 A1 * 8/2004 Anezaki et al. ............. 700/264
2006/0079817 A1 * 4/2006 Dewald et al. ................. 601/5

* cited by examiner

*Primary Examiner*—Bentsu Ro
(74) *Attorney, Agent, or Firm*—WPAT, PC; Justin King

(57) ABSTRACT

The present invention relates to a rehabilitation robot and a tutorial learning method for the rehabilitation robot. The rehabilitation robot comprises a robotic device, a rehabilitation mode control unit, and a driving unit. The robotic device comprises at least a motor capable of controlling the joints of the robotic device. The rehabilitation mode control unit further comprises a tutorial learning module capable of enabling the rehabilitation robot to learn a rehabilitation operation of a physiotherapist in a tutorial manner as he/she is operating the rehabilitation robot while registering the rehabilitation operation as an operation mode of the same. When the rehabilitation robot is used for performing a therapeutic session on a patient and a tutorial learning mode is selected for the rehabilitation robot, it is required to have a physiotherapist operate the rehabilitation robot and the same time that the rehabilitation robot will register motor actuation parameters corresponding to the therapeutic session into the tutorial learning module. On the other hand, when an automatic rehabilitation mode is selected, the rehabilitation robot will access the motor actuation parameters registered in the tutorial learning module so as to reproduce the therapeutic session simulating the physiotherapist.

11 Claims, 3 Drawing Sheets

REHABILITATION ROBOT AND TUTORIAL LEARNING METHOD THEREFOR

BACKGROUND OF THE INVENTION

1. Field of the Invention

The present invention generally relates to a rehabilitation robot and a tutorial learning method for the rehabilitation robot and, more particularly, to a rehabilitation robot capable of learning a therapeutic session from a physiotherapist and reproduce the therapeutic session simulating the physiotherapist, and a tutorial learning method therefore.

2. Description of the Prior Art

A rehabilitation robot is used to assist a patient during a therapeutic session. Therefore, it is better that the rehabilitation robot is capable of performing a therapeutic session simulating a physiotherapist. Conventionally, the rehabilitation robot has a built-in rehabilitation mode, which is operated according to the mode selected by the user to determine the speed and the position and repeat the therapeutic session. However, the effect is limited because the rehabilitation robot only performs and repeats based on pre-set rehabilitation mode and cannot modify the therapeutic session according to each patient.

SUMMARY OF THE INVENTION

It is an object of the present invention to provide to a rehabilitation robot and a tutorial learning method for the rehabilitation robot so as to provide tutorial learning in a rehabilitation mode.

In order to achieve the foregoing object, the present invention provides a tutorial learning method for a rehabilitation robot, comprising at least steps of:

providing a rehabilitation robot, comprising at least a motor capable of controlling the joints of the rehabilitation robot and a tutorial learning module capable of providing tutorial learning in a rehabilitation mode;

performing a tutorial learning mode capable of registering motor actuation parameters into the tutorial learning module; and performing rehabilitation mode for accessing the motor actuation parameters and transmitting the motor actuation parameters to the motor.

In order to achieve the foregoing object, the present invention further provides a rehabilitation robot, comprising at least:

a robotic device, comprising at least a motor capable of controlling the joints of the robotic device;

a rehabilitation mode control unit, capable of providing and controlling a rehabilitation mode, the rehabilitation mode control unit comprising a rehabilitation mode controller capable of controlling the rehabilitation mode, and a tutorial learning module capable of providing tutorial learning of the rehabilitation mode; and a driving unit, capable of driving the motor.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE PREFERRED EMBODIMENT

The present invention can be exemplified by but not limited to the preferred embodiments as described hereinafter.

Figure 1:
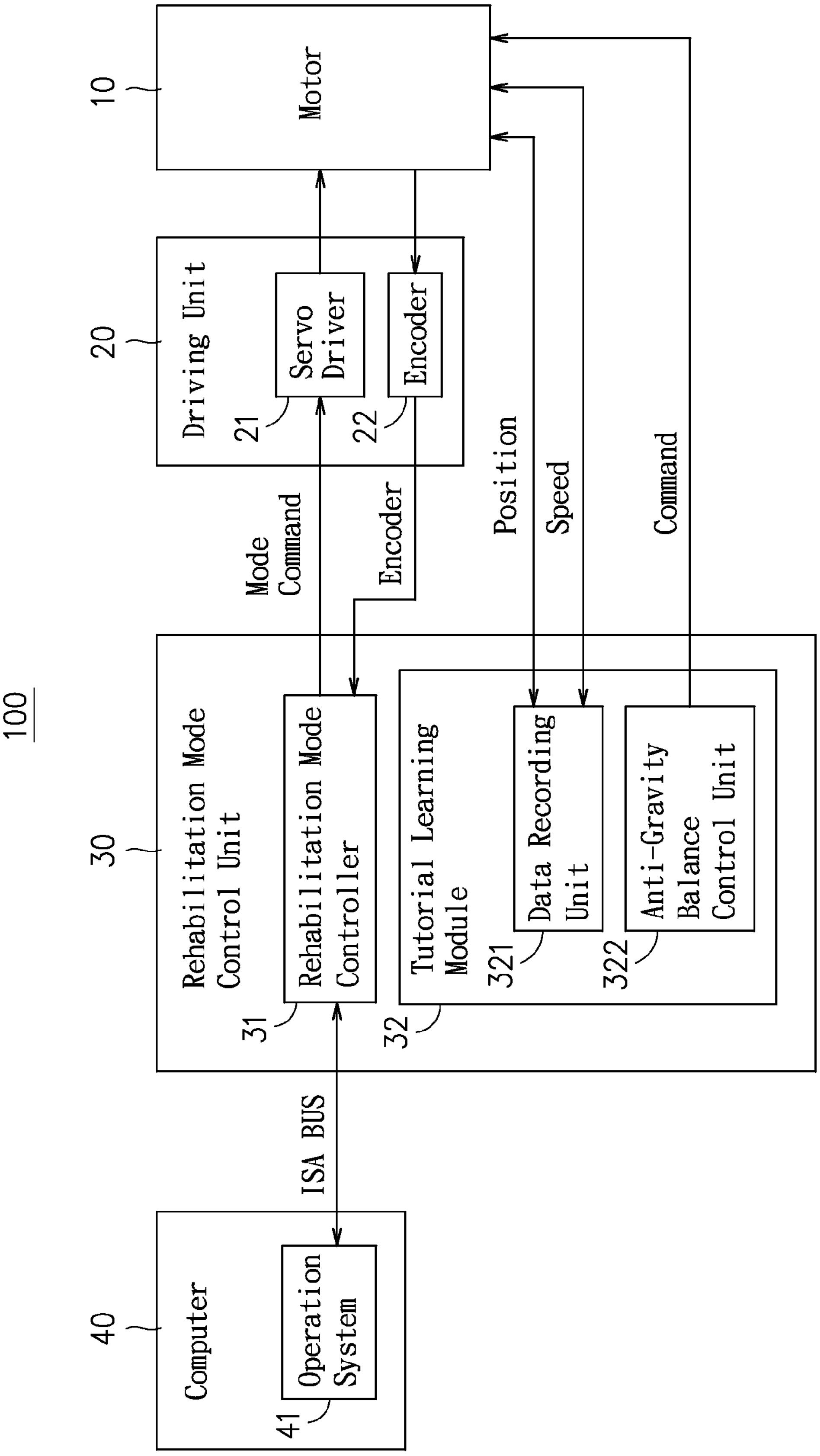
FIG. 1 is a block diagram showing a rehabilitation robot according to the present invention.

Please refer to FIG. 1, which is a block diagram showing a rehabilitation robot according to the present invention. The rehabilitation robot 100 comprises at least a motor 10, a driving unit 20 and a rehabilitation mode control unit 30. The motor 10 is a servo motor, disposed at the joint of a robotic device (not shown). The number of the motor 10 depends on the type of the robotic device and is not restricted.

The driving unit 20 is capable of driving the motor 10. The driving unit 20 comprises a servo driver 21 and an encoder 22. The servo driver 21 is capable of receiving a mode command signal from a rehabilitation mode controller 31 (disposed inside the rehabilitation mode control unit) to control the motor 10. The encoder 22 is capable of detecting the motor 10. Generally, the encoder 22 is disposed on the shaft of the motor so as to detect the rotation rate, the rotation angle, and the rotation direction of the shaft and transmits the detected result to the rehabilitation mode controller 31.

The rehabilitation mode control unit 30 is capable of providing and controlling the rehabilitation mode. The rehabilitation mode control unit 30 comprises a rehabilitation mode controller 31 and a tutorial learning module 32. The rehabilitation mode controller 31 is coupled to the computer 40 by an ISA (industry standard architecture) bus and is operated based on the operation system (OS) 41 to perform data transmission and control the control rehabilitation mode. The tutorial learning module 32 is capable of providing tutorial learning in a rehabilitation mode and performing anti-gravity balance control. The tutorial learning module 32 is described hereinafter.

The rehabilitation mode controller 31 is capable of receiving a rehabilitation mode signal from the operation system 41 to generate a mode command and transmit the mode command to the servo driver 21 of the driving unit 20 to drive the motor 10. Similarly, information of the operation of the motor 10 is fed back through the encoder 22 to the rehabilitation mode controller 31 and then transmitted to the operation system 41 in the computer 40.

It is noted that, generally, the computer 40 further comprises user interfaces such as a keyboard and a monitor so that the user can determine parameters such as the rehabilitation time and rehabilitation mode of the rehabilitation robot and determine the mode.

Moreover, the computer 40 usually comprises a storage unit capable of accessing the rehabilitation mode. However, the description is well known to those with ordinary skills in the art and is not repeated.

The present invention is characterized in that the rehabilitation mode control unit 30 comprises a tutorial learning module 32. The tutorial learning module 32 comprises a data recording unit 321 and a anti-gravity balance control unit 322. The data recording unit 321 is capable of accessing the activation parameters for the motor 10. Generally, the activation parameters for the motor 10 include the motor position and the motor speed. The anti-gravity balance control unit 322 is capable of overcoming the gravity of the rehabilitation robot. The torsion of the motor 10 is detected by feedback detection of the torsion to provide anti-gravity balance.

Figure 3:
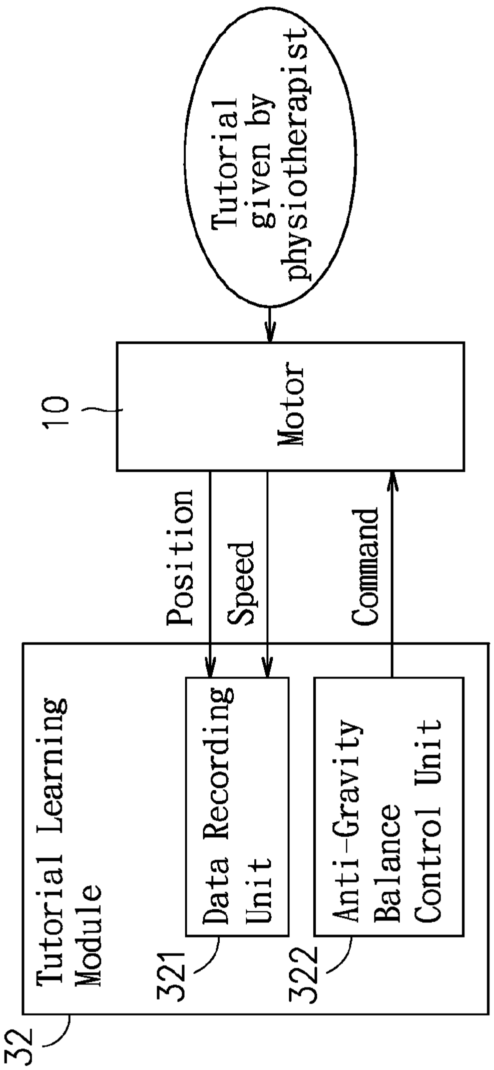
FIG. 3 is a block diagram showing a system for implementing a tutorial learning mode according to the present invention.
Figure 2:
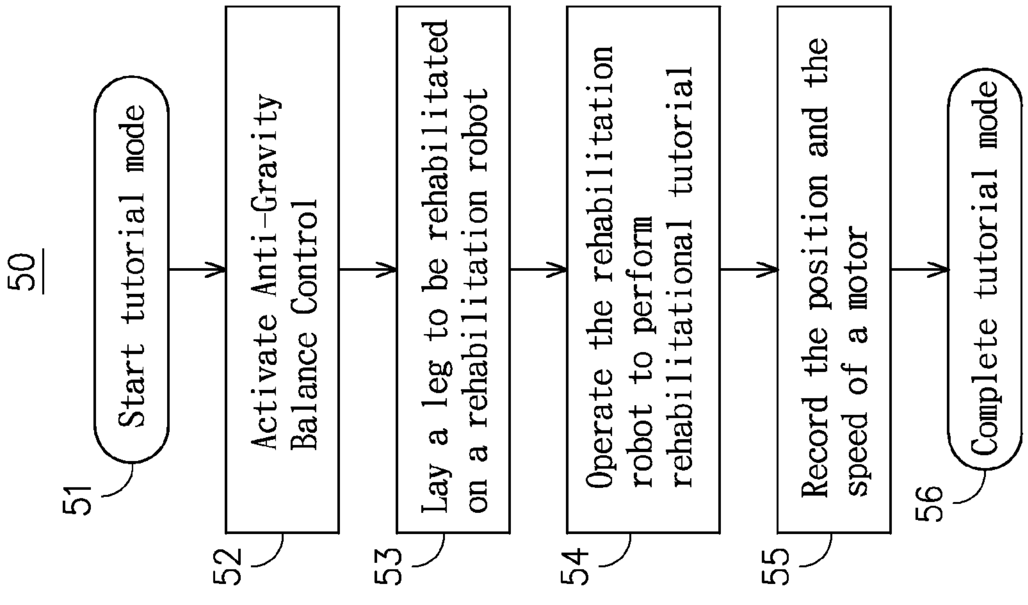
FIG. 2 is a flow-chart of a tutorial learning mode according to the present invention.

Please refer to FIG. 2 and FIG. 3 for a flow-chart of a tutorial learning mode and a system for implementing the tutorial learning mode according to the present invention. In the present embodiment, the flow-chart 50 is exemplified using a leg in the tutorial learning mode of the present invention.

In Step 51, the tutorial learning mode begins. The computer 40 in FIG. 1 switches the system in a tutorial learning mode;

In Step 52, anti-gravity balance control is activated. When the system is operated in the tutorial learning mode, the anti-gravity balance control unit 322 is activated for performing anti-gravity balance control.

In Step 53, a leg of a patient to be rehabilitated is laid on the rehabilitation robot.

In Step 54, a physiotherapist operates the rehabilitation robot to perform rehabilitation. The physiotherapist enables the rehabilitation robot to move with the leg of the patient to perform swinging, bending, and stretching. Meanwhile, the anti-gravity balance control unit 322 automatically detects the torsion of the motor 10 to provide anti-gravity balance.

In Step 55, the position and the speed at every unit time of the motor is recorded. The tutorial learning module 32 collects the position and the speed at every unit time of the motor and register the data in the data recording unit 321.

In Step 56, the tutorial learning mode is completed. When the physiotherapist stops tutoring, the operation mode is switched to a rehabilitation mode and thus the tutorial learning mode is completed. The tutorial learning module 32 controls the motor 10 according to the data registered in the data recording unit 321 to reconstruct the rehabilitation mode. By repeating the foregoing steps, different rehabilitation modes can be recorded. The rehabilitation mode can be designed according to different parts of the body such as the arm, the neck, the shoulder, the waist and the back so that the user can perform rehabilitation based on the selected rehabilitation mode.

Figure 5:
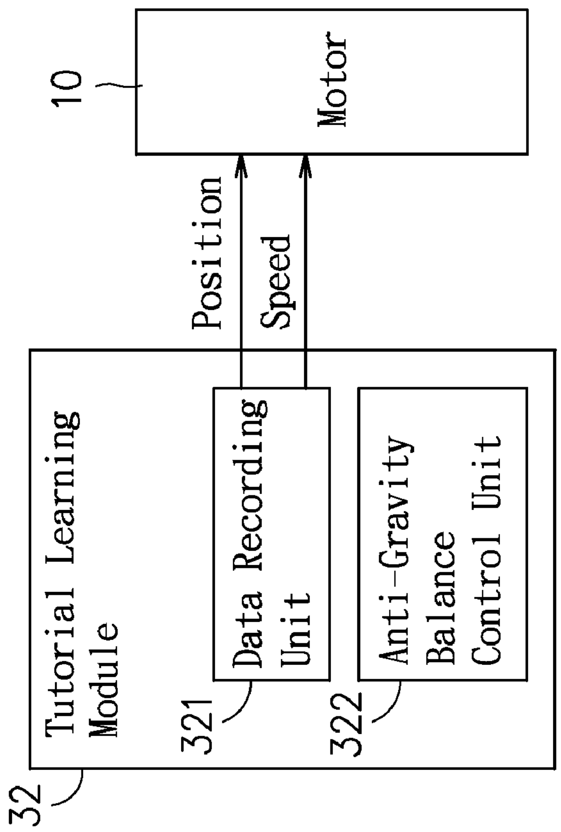
FIG. 5 is a block diagram showing a system for implementing a rehabilitation mode according to the present invention.
Figure 4:
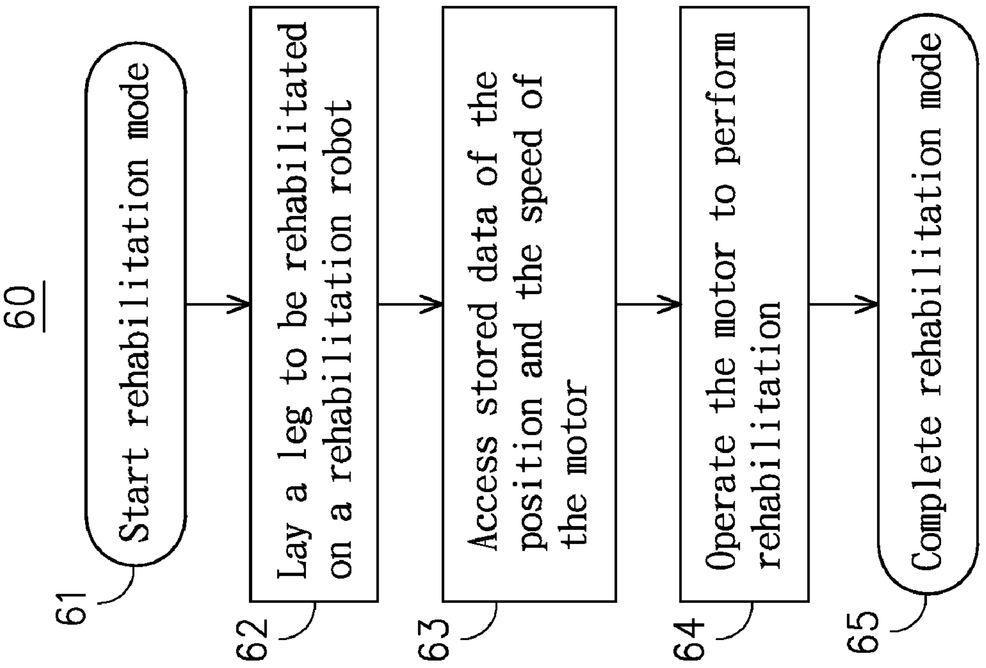
FIG. 4 is a flow-chart of a rehabilitation mode according to the present invention.

Please refer to FIG. 4 and FIG. 5 for a flow-chart of a rehabilitation mode and a system for implementing the rehabilitation mode according to the present invention. In the present embodiment, the flow-chart 60 is exemplified using a leg in the rehabilitation mode of the present invention.

In Step 61, the rehabilitation mode begins. The computer 40 in FIG. 1 switches the system in a rehabilitation mode.

In Step 62, a leg of a patient to be rehabilitated is laid on the rehabilitation robot.

In Step 63, stored data of the position and the speed of the motor is accessed. According to the selected rehabilitation mode, the data recording unit 321 accesses the position and the speed of the corresponding motor 10 and transmits the data to the motor 10.

In Step 64, the motor is operated to perform rehabilitation. After the motor 10 receives data of the position and the speed of the motor, the rehabilitation mode can be reconstructed.

In Step 65, the rehabilitation mode is completed.

According to the flow-charts of the tutorial learning mode and the rehabilitation mode, the tutorial learning method for a rehabilitation robot, comprising at least steps of: providing a rehabilitation robot, comprising at least a motor capable of controlling the joints of the rehabilitation robot and a tutorial learning module capable of providing tutorial learning in a rehabilitation mode; performing a tutorial learning mode capable of registering motor actuation parameters into the tutorial learning module; and performing rehabilitation mode for accessing the motor actuation parameters and transmitting the motor actuation parameters to the motor.

Therefore, the rehabilitation robot of the present invention comprises a tutorial learning module so that a professional physiotherapist tutors the rehabilitation robot to perform rehabilitation. Meanwhile, the rehabilitation robot is capable of learning a therapeutic session from a physiotherapist and reproducing the therapeutic session simulating the physiotherapist. In this manner, the therapeutic session performed by the rehabilitation robot can achieve excellent performance. Moreover, the physiotherapist can train the rehabilitation robot corresponding to each patient so that the rehabilitation robot performs rehabilitation with more efficiency and shorten the period of treatment. The tutorial learning mode and the rehabilitation mode can be implemented by using software (provided by the computer in FIG. 1, for example).

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A tutorial learning method for a rehabilitation robot, comprising at least steps of:

providing a rehabilitation robot, comprising at least a motor capable of controlling the joints of the rehabilitation robot and a tutorial learning module capable of providing tutorial learning in a rehabilitation mode, wherein the tutorial learning module comprises:

a data recording unit capable of accessing the motor actuation parameters; and an anti-gravity balance control unit capable of detecting the torsion of the motor;

performing a tutorial learning mode capable of registering motor actuation parameters into the tutorial learning module; and performing rehabilitation mode for accessing the motor actuation parameters and transmitting the motor actuation parameters to the motor.

2. The tutorial learning method for a rehabilitation robot as recited in claim 1, wherein the tutorial learning mode comprising at least steps of:

starting the tutorial learning mode;

activating the anti-gravity balance control unit for performing anti-gravity balance control;

laying a limb of a patient to be rehabilitated on the rehabilitation robot;

operating the rehabilitation robot to perform rehabilitation;

recording the position and the speed at every unit time of the motor in the data recording unit; and completing the tutorial learning mode.

3. The tutorial learning method for a rehabilitation robot as recited in claim 1, wherein the rehabilitation mode comprising at least steps of:

starting the rehabilitation mode;

laying a limb of a patient to be rehabilitated on the rehabilitation robot;

accessing stored data of the position and the speed of the motor to reconstruct the rehabilitation mode;

operating the motor to perform rehabilitation; and completing the rehabilitation mode.

4. The tutorial learning method for a rehabilitation robot as recited in claim 1, wherein the rehabilitation robot further comprises a computer capable of operating the rehabilitation robot in the tutorial learning mode or the rehabilitation mode.

5. The tutorial learning method for a rehabilitation robot as recited in claim 1, wherein the motor is a servo motor.

6. A rehabilitation robot, comprising:

a robotic device, comprising a motor capable of controlling the joints of the robotic device;

a rehabilitation mode control unit, capable of providing and controlling a rehabilitation mode, the rehabilitation mode control unit comprising a rehabilitation mode controller capable of controlling the rehabilitation mode, and a tutorial learning module capable of providing tutorial learning of the rehabilitation mode;

a driving unit, capable of driving the motor; and the tutorial learning module, comprising a data recording unit capable of accessing the motor actuation parameters; and an anti-gravity balance control unit capable of detecting the torsion of the motor.

7. The rehabilitation robot as recited in claim 6, wherein the driving unit comprising at least:

a servo driver capable of receiving a command signal of the rehabilitation mode controller to control the motor;

an encoder capable of detecting the motor and transmitting the detected result to the rehabilitation mode controller.

8. The rehabilitation robot as recited in claim 7, wherein the encoder is capable of detecting the rotation rate, the rotation angle, and the rotation direction of the motor.

9. The rehabilitation robot as recited in claim 6, wherein the rehabilitation mode controller is coupled to a computer to perform data transmission.

10. The rehabilitation robot as recited in claim 9, wherein the rehabilitation mode controller is coupled to the computer by an ISA (industry standard architecture) bus.

11. The rehabilitation robot as recited in claim 6, wherein the motor is a servo motor.

* * * * *